United States Patent [19]

Decoux

[11] Patent Number: 4,605,046
[45] Date of Patent: Aug. 12, 1986

[54] PROCESS AND DEVICE FOR FEEDING MACHINES FOR WELDING WIRE MESH WITH WEFT WIRES

[76] Inventor: Pierre Decoux, 6, Grand'Place, B - 5950 Orp-Jauche, Belgium

[21] Appl. No.: 604,288

[22] Filed: Apr. 26, 1984

[30] Foreign Application Priority Data

May 3, 1983 [LU] Luxembourg .......................... 84785

[51] Int. Cl.[4] ............................................. B21F 15/08
[52] U.S. Cl. ...................................... 140/112; 193/46; 198/417
[58] Field of Search .......................... 140/112; 193/46; 198/417; 219/56; 245/8

[56] References Cited

U.S. PATENT DOCUMENTS

| | | | |
|---|---|---|---|
| 1,815,029 | 7/1931 | Albertoli | 193/46 |
| 3,086,639 | 4/1963 | Donotrio | 198/396 |
| 3,372,815 | 3/1968 | Lovendosky | 198/627 |
| 3,515,177 | 6/1970 | Goh et al. | 140/112 |
| 4,458,801 | 7/1984 | Nichols | 193/46 |

FOREIGN PATENT DOCUMENTS 597796  3/1978  U.S.S.R. ................. 219/56

Primary Examiner—Francis S. Husar
Assistant Examiner—Robert Showalter
Attorney, Agent, or Firm—Sughrue, Mion, Zinn, Macpeak & Seas

[57] ABSTRACT

A process and a device for feeding a machine for welding mesh with weft wires. A sheet of parallel warp wires is moved towards a welding station, as are weft wires which have been cut to length. The warp and weft wires are moved forward in substantially the same direction and the weft wires undergo a change in direction to the extent that the weft wires run in a direction which is substantially perpendicular to the warp wires when said weft wires reach them.

17 Claims, 5 Drawing Figures

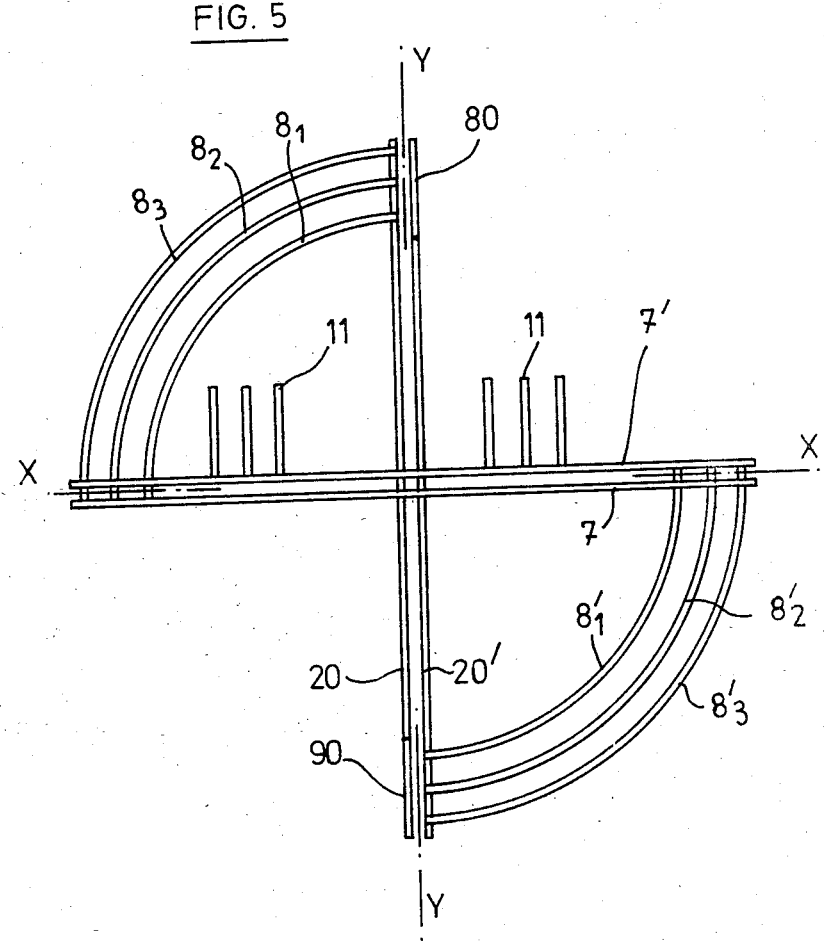

PROCESS AND DEVICE FOR FEEDING MACHINES FOR WELDING WIRE MESH WITH WEFT WIRES

BACKGROUND OF THE INVENTION

The present invention relates to a process and to a device for feeding machines for welding wire mesh with weft wires which enable the feeding rate to be increased, thereby matching the performances of modern welding machines.

In this specification, the terms "warp wires" and "weft wires" are to be understood as meaning wires which are generally of any metal, for example steel, the cross-section of which may be of any size or shape, for example circular or toothed.

To manufacture welded mesh, the warp wires are moved forward relatively close to each other, depending on the type and width of mesh to be produced, and the weft wires are placed onto the warp wires and welded thereto, thus joining them to the warp wires.

Prior to use, the weft wires should be dressed and cut to length.

The resulting "rods" are generally first dressed and cut, brought to the welding machine and usually placed in a storage chamber or other device from where they are taken when required. The rods have to be stored and manipulated in this process.

In some machines the rods are injected when needed from the dressing and cutting devices which are positioned perpendicular to the warp wires and this slows down the working rate as the weft wires have to cross the entire width of the warp before they can be welded.

One or more dressing and cutting devices may also be positioned above the store chamber of the welding machine and perpendicular to the warp wires, but this occupies considerable space and creates an obstruction which makes it difficult to control and service the welding machine and dressing devices.

SUMMARY OF THE INVENTION

An object of the present invention is to overcome the disadvantages of known arrangements.

The present invention thus provides a process for feeding a machine for welding mesh with weft wires, in which a series of parallel warp wires is moved towards a welding station and weft wires which have been cut to length are moved towards the same welding station, characterised in that the warp and weft wires are moved forward in substantially the same direction and, under the effects of gravity, the weft wires undergo a change in direction to the extent that said weft wires run in a direction which is substantially perpendicular to the warp wires when the weft wires reach them.

The present invention also relates to a device for feeding a machine for welding wire mesh with weft and warp wires, characterised in that the axes of longitudinal progression of the various devices for feeding the warp and weft wires are substantially parallel and the weft wires are conveyed to the series of warp wires by a transfer device which receives, by gravity, the weft wires which have been cut into sections and, likewise by gravity, changes the direction thereof by an angle, such that the weft wires run in a direction which is substantially perpendicular to the direction in which the series of warp wires advances, the change in direction of the weft wires being brought about by gravity alone, without the intervention of any moveable member.

The change in direction by the weft wires to one which is perpendicular to that of the warp wires means that the weft wires have to pivot about a vertical axis. As the wire may be several meters in length, this pivoting motion would be difficult to produce by mechanical means within a relatively short time. The inertia and the poor rigidity of the wire would cause it to severely vibrate, and this would impair the smooth operation of the process.

A rigid support rotating with the wire and supporting it over its total length would demand relatively heavy mechanical members and an ejection device subsequent to rotation.

To overcome the disadvantages of the various devices under discussion, an object of the process according to the present invention is to make the weft wires change direction by allowing them to proceed along at least one helicoid incline by gravity.

In a preferred embodiment of the transfer device according to the present invention, this device comprises two helicoid inclines consisting of support guides in the shape of helices having the same pitch, which helices have common axes which are substantially perpendicular to the series of warp wires, the top of the support guides being fixed to an upper support system along an axis which runs parallel to the longitudinal axis of the weft wires on emerging from a device which cuts them into sections, and the bottom of the support guides being fixed to a lower support system, along an axis which runs perpendicular to the longitudinal axis of the series of warp wires.

In this preferred embodiment, the support guides which form one of the inclines extend from a section of an axis of the upper support system to a section of an axis of the lower support system, and the other incline extends from another section of another axis of the upper support system to another section of another axis of the lower support system, and the two inclines are positioned on either side of an ideal line which is perpendicular to the series of warp wires and about which the two inclines rotate in the same direction.

Thus, the weft wires which have been cut to length or rods which, under the action of their own weight, drop down the two inclines, pivot about this ideal line.

BRIEF DESCRIPTION OF THE DRAWINGS

The invention will now be described by way of example by means of one example of an embodiment which in no way limits the scope of the invention, with reference to the accompanying drawings:

FIG. 5 is a diagrammatical plan view, from above, of the transfer device.

DETAILED DESCRIPTION

Figure 1:
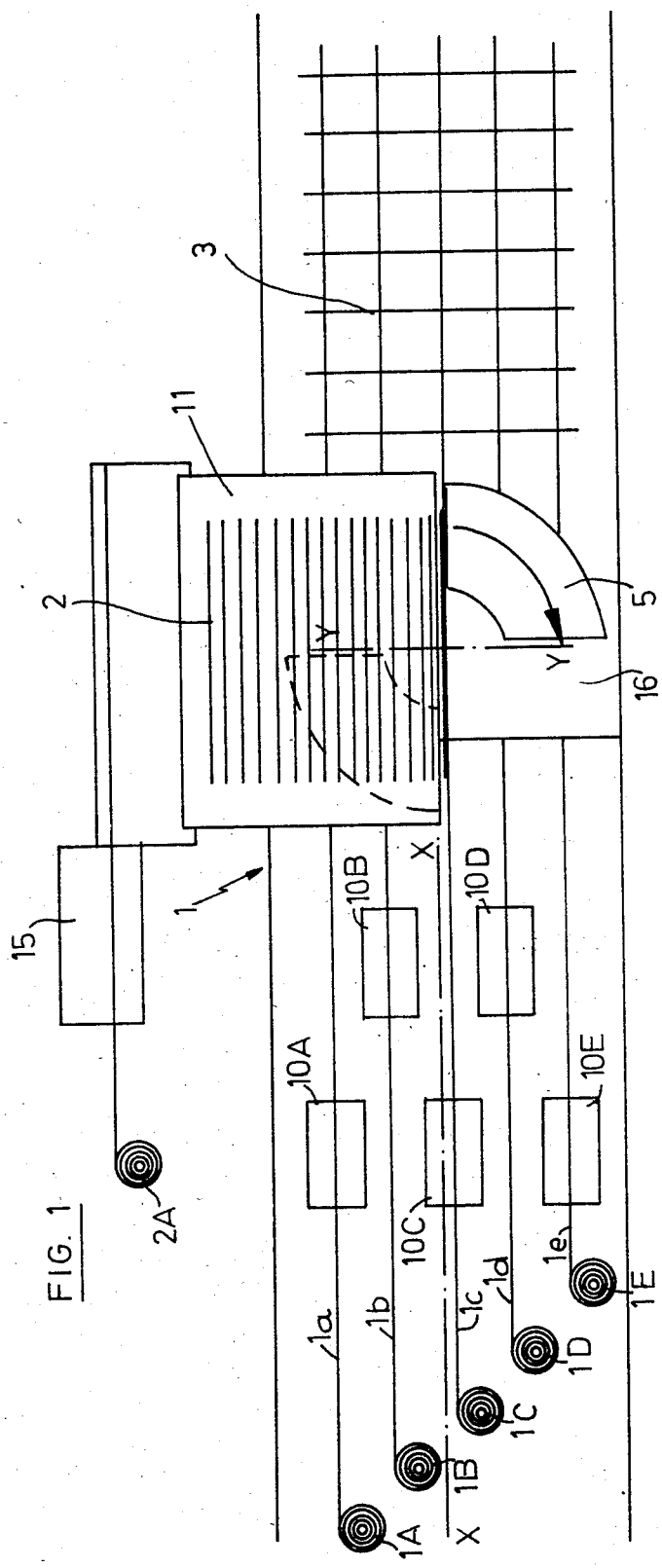
FIG. 1 is a diagrammatical plan view of the transfer device according to the present invention, which is positioned in relation to the systems for feeding a welding machine with weft and warp wires.

In FIG. 1, 1A, 1B, 1C . . . 1E indicate the rollers which supply the warp wires 1a, 1b, 1c . . . 1e which together form the series of warp wires indicated by reference numeral 1, possibly after having been treated by a series of apparatus, indicated by 10A, 10B, 10C . . . 10E, and taut in each case.

Weft wires are drawn by rollers 2A . . . (only the first of which has been shown, 2A), dressed and cut in the treatment assembly 15, and placed, with a whole batch of weft wires, on a lateral transfer platform 11. From there the wires pass to a transfer device, indicated by 5, which, after having changed the direction of the weft wires by about 90°, conveys them to a storage chamber for example (not shown), which subsequently places them at a selected rate onto the warp wires 1. A welding device 16 then joins the weft wires to the warp wires to form a mesh 3 which is to be manufactured. When the mesh 3 is complete it is wound onto a beam (not shown) or cut to the length desired. As can be seen in FIG. 1, the weft wires are treated cut and moved forward in a series of apparatus (15), only one of which is shown in FIG. 1, the axis of longitudinal progression of which is parallel to the axis of longitudinal progression of the apparatus for treating the warp wires, which is also the axis of advance XX of the sheet 1 which the warp wires form.

This system differs from known systems in that the relevant series of apparatus is arranged parallel to the weft and warp wires, and this new arrangement allows the space taken up by the machines to be substantially reduced and affords easier access to the parts thereof. In common with former systems, the weft wires which have been cut to length arrive on the sheet or series 1 of warp wires from above in this system.

As the weft wires which have been cut to length and are thus in the form of "rods" are supplied in this system in the same direction as the warp wires 1, before they can be welded together, the weft wires have to be placed on the warp wires in the direction YY which is perpendicular to the direction in which the warp wires advance. The function of the transfer device 5 according to the present invention will now be described in more detail.

Figure 2:
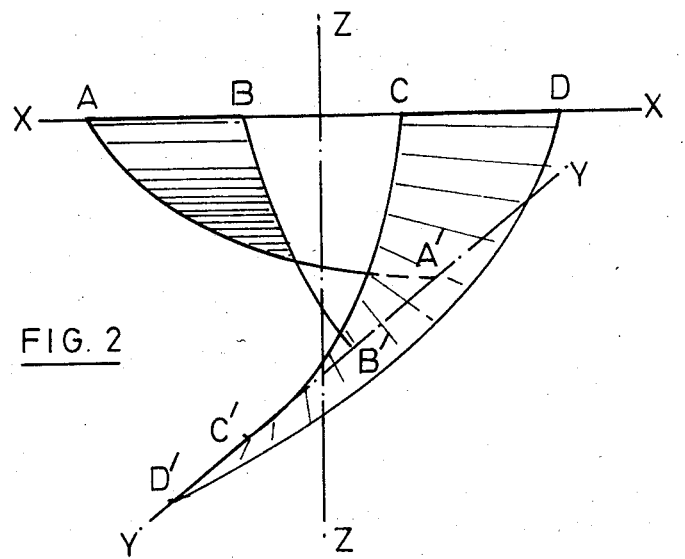
FIG. 2 is a theoretical diagram which helps to explain the principle upon which the transfer system according to the present invention operates.

In order to understand more clearly the principle of the device, we should now turn our attention to FIG. 2 in which two inclines are shown which are formed by continuous helicoid belts, AB-A'B' and CD-C'D'. These belts rotate in the same direction about axis ZZ. Sections AB and CD belong to the same horizontal straight line XX which is at a higher level, whereas sections A'B' and C'D' belong to the same horizontal straight line YY which is at a lower level. The straight lines XX and ZZ form an angle of 90° with each other in space.

Now, if a rod of almost the same length as the distance between A and D is placed at the top of the two inclines, in a straight line with sections AB and CD and in the plane of the two inclines, this rod would drop down the two belts under the action of its own weight and would leave them along sections A'B', C'D' of the straight line YY, that is that the device formed by the two inclines would have transferred the rod from an upper level to a lower level, while changing the direction thereof by 90°.

It is clear that the above process could also take place if only one incline was used. It was considered, however, that it is preferrable to use two inclines to manipulate long flexible wires.

Figure 3:
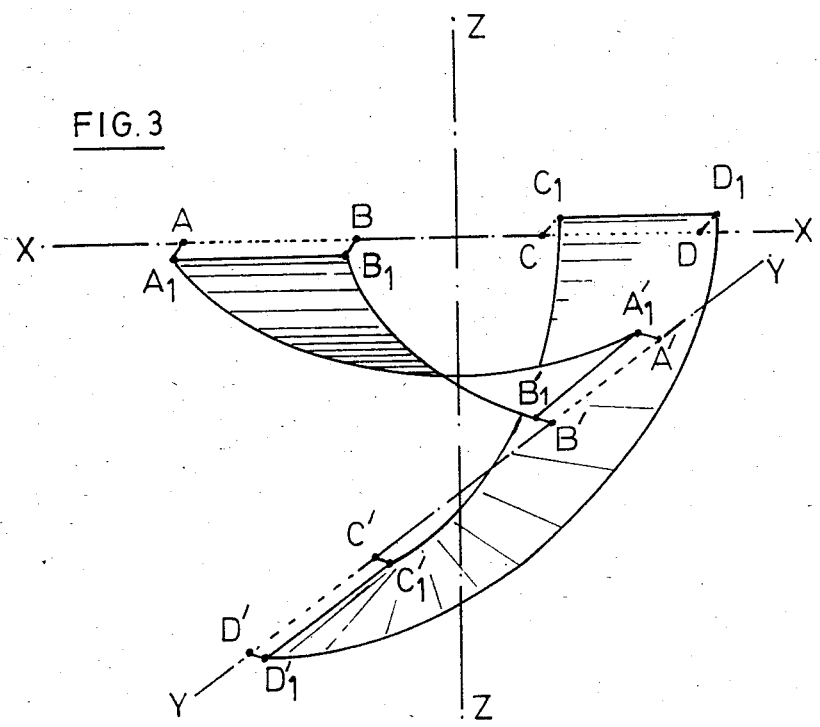
FIG. 3 is a theoretical diagram similar to that shown in FIG. 2 except that it relates to a real situation.

In a practical embodiment of a device functioning on the principle which has Just been explained, the fact that the rods have a certain diameter in real life and that it is therefore impossible to make them drop in the same plane as the inclines has to be taken into account. The rods also have to be simultaneously placed on the two inclines. This is only possible if the two inclines are slightly displaced from the position which they occupy in FIG. 2. FIG. 3 shows the position which the inclines would in fact have. The section of the first incline from which the rods depart is designated in this instance by $A_1B_1$ (parallel to section AB but in front of this section, seen by an observer facing the Figure). The section of this same incline at which the rods arrive in the lower horizontal plane is designated by $A_1'$ $B_1'$ (to the left hand side of axis YY, seen by the same observer). The other incline is displaced in the opposite direction, so that the section at which the rods depart is $C_1$ $D_1$ but is behind section C D, seen from the observer's viewpoint The section at which the rods arrive on this incline is $C_1'D_1'$, to the right-hand side of axis YY, seen from the observer's viewpoint. Under these conditions, an actual rod which has a diameter of less than the equal gaps A $A_1=C$ $C_1$ could be placed at the top of the inclines with the longitudinal axis thereof in coincidence with axis XX and this rod would leave the device when the longitudinal axis thereof reaches the position of axis YY.

Figure 4:
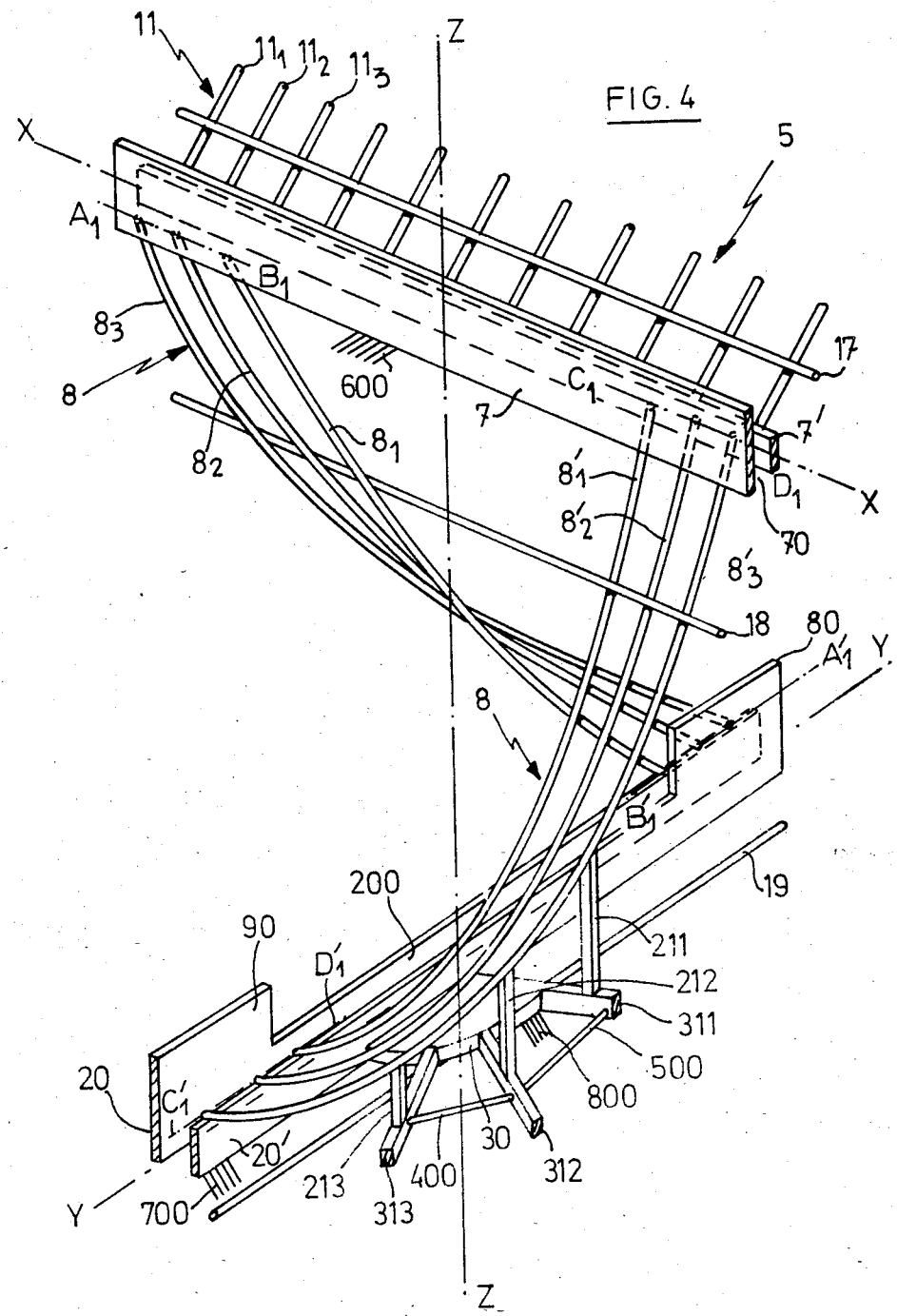
FIG. 4 is a diagrammatical perspective view of the whole of the transfer device according to the present invention.

A further characteristic of the practical embodiment of the device, the operating principle of which was described with reference to FIG. 2, is that the inclines are not in fact formed by a belt which has a continuous surface but by support guides in the shape of helices having, in the present embodiment, a common axis, axis ZZ of FIGS. 2 and 3. These support guides preferably consist of bars 8 (c.f. FIG. 4) with a round cross-section so that the rods which are placed on them only touch them at points and this reduces friction and prevents dirt which may have fallen onto the inclines from disturbing the steady speed at which the rods drop, as would be the case if the inclines consisted of belts. The Figures only show three support guides for each incline, but it is clear that this number is not intended to be limiting.

FIG. 4 diagramatioally shows a perspective view of all the elements of the transfer device 5. $8_1,8_2,8_3$ and $8_1',8_2',8_3'$ designate the support guides of the two helicoid sheets which have already been dicussed. The sheets extend between an upper support system comprising two parallel bars 7 and 7' which are positioned on either side of axis XX and a lower support system comprising two parallel bars 20 and 20' which are positioned on either side of axis YY'. An axis is marked on bar 7' which shows section $C_1D_1$ of FIG. 3 and an axis indicating section $A_1B_1$ of FIG. 3 is marked on bar 7. In the present embodiment, the ends of the support guides $8_1,8_2,8_3$, and $8_1',8_2',8_3'$ which belong to the two inclines respectively are fixed to bars 7,7' along these axes. could be supported on certain supports on condition that these so that a rod arriving in passage 70 between the bars 7 and 7' would fall onto the support guides. Reference numeral 11 shows a series of small parallel bars $11_1,11_2,$ $11_3$, which guide the rods (one of which is shown by reference numeral 17) to the passage 70 which has just been mentioned. To prevent the rods from dropping at speed down the inclined plane 11 passing bar 7 and thus overshooting passage 70, bar 7 is higher than bar 7', and thus forms a stop. Instead of this arrangement, bar 7 could have vertical tongues as stops.

The rods which have crossed passage 70 fall on the two sheets of support guides 8 and then drop down, as rod 18 shows, before reaching the lower support system, formed by the two bars 20,20', to which the ends of the support guides $8_1,8_2,8_3$, and $8_1',8_2',8_3'$ are fixed respectivly along axes $A_1',B_1'$ on bar 20 and $C_1',D_1'$, on bar 20'. The end of bar 20, unlike the end of bar 20' to which the lower ends of the support guides $8_1',8_2',8_3'$ are attached is raised, as shown by reference numeral 90. Likewise, the end of bar 20', unlike the end of bar 20 to which the lower ends of the support guides $8_1,8_2,8_3$ are attached is raised as shown by reference numeral 80. The elevations 80 and 90 act as stops for the rods which arrive at the lower supporting system and thus ensure that the rods pass through passage 200 between bars 20 and 20'. Bars 20 and 20' could equally well have tongues acting as stops instead of elevations 80 and 90.

Reference numeral 19 designates a rod which has passed through passage 200 and which is ready to be taken to the feeding store chamber (not shown) of the welding machine.

As can also be seen in FIG. 4, the support guides are held at intervals by uprights 211,212,213 which are supported by radial beams 311,312,313 which are connected to each other by reinforcing arms 400, 500 and which beams radiate from the ideal axis ZZ of the whole of the transfer device. For reasons of clarity only the supports of one support guide $8_3'$ have been shown but similar supports are provided for the support guides $8_1'$ and $8_2'$. A similar system which cannot be seen in FIG. 4 supports the support guides $8_1,8_2$, and $8_3$.

The radial beams 311,312,313 are fixed to the periphery by a quadrant - shaped plate 30 which is itself fixed to bar 20'. A similar plate 30, is provided for beams 311',312',313' which act as supports for uprights similar to uprights 211,212,213 . . . etc, which support the conveying guiding devices $8_1,8_2$, and $8_3$. This identical system has not been shown in FIG. 4 to keep the diagram straightforward.

It is clear that the whole device is equipped, wherever necessary, with supporting and linking elements which ensure the rigidity thereof and the resistance thereof to shocks and vibrations caused by the movements of the rods as they drop down the transfer device. The various linking means have not been shown on the drawing for reasons of clarity, but they are shown by the shading indicated by 600 for bar 7 and 700 for bar 20' to show the integral nature thereof with the frame of the apparatus. The same has been shown for plate 20 (by 800) which acts as a central link for beams 311, 312 and 313.

It should be noted that the angle between axis XX (direction of the weft wires as they depart) and axis YY (direction of the wires on arrival, perpendicular to the warp wires) may be different from 90° if the running directions of the treatment apparatus (15 and 10A etc . . . ) form an angle other than zero with each other.

FIG. 5 is a plan view which is self-explanatory and on which the reference numerals of the above-mentioned main elements of the transfer device have been shown. Only some of the small bars 11 have been shown in FIG. 5, which does not show the supporting systems for the support guides either.

I claim:

1. A process for feeding weft wires to a machine for welding mesh, in which a series of parallel warp wires is moved towards a welding station, as is a series of weft wires which have been cut to length, said process comprising the steps of moving forward the warp and the weft wires in substantially a same first direction, so that the cut weft wires reach a position wherein they are at a higher level than the series of parallel warp wires and then dropping and simultaneously twisting said weft wires under the effect of gravity toward a second direction displaced from said first direction by an angle, such that the weft wires are longitudinally disposed in said second direction which is substantially perpendicular to the warp wires when the weft wires reach them.

2. A process according to claim 1, wherein said dropping and twisting step comprises allowing said weft wires to follow by gravity at least one helicoid incline.

3. A process according to claim 1, wherein said angle is substantially 90°.

4. A device for feeding a machine for combining weft wires and warp wires, comprising:
   first means for feeding a plurality of said warp wires in a first direction to form a web of said warp wires;
   second means located above said first means for feeding said weft wires longitudinally in a direction substantially parallel to said first direction, at a higher level than the series of warp wires formed by said first means;
   third means adjacent said second means for cutting said weft wires into sections of predetermined length, said cutting means receiving said weft wires from said second means;
   transfer means located above said first means, for receiving by gravity the cut weft wires, and for changing the direction of said weft wires, by gravity alone, to the extent that the weft wires longitudinally run in a second direction substantially perpendicular to said first direction when they reach the series of warp wires; and
   guide means located adjacent said transfer means for transferring said cut weft wires from said cutting means to said transfer means, at least a terminal portion of said guide means being arranged so as to release said weft wires so that they fall by gravitational force into said transfer means.

5. A device according to claim 4, wherein the transfer device has at least one helicoid incline.

6. A device according to claim 4, wherein the transfer means has two helicoid inclines consisting of support guides in the shape of helices which have the same pitch and have a common rotation axis which is substantially perpendicular to the series of said warp wires fed by said first feeding means.

7. A device according to claim 6, further comprising an upper support system and a lower support system, wherein the top of the support guides is fixed to said upper support system along an axis which runs parallel to said first direction, and the bottom of the support guides is fixed to said lower supporting system along an axis which runs perpendicular to said first direction.

8. A device according to claim 7, wherein one of the inclines extends between a section of a first axis of the upper support system to a section of a second axis of the lower support system, and the other incline extends between another section of a third axis different from said first axis of the upper support system and another section of a fourth axis different from said second axis of the lower support system and the two inclines are positioned on either side of an ideal straight line which is perpendicular to said first direction and about which the two inclines rotation in the same direction.

9. A device according to claim 7, wherein the upper support system comprises a horizontal bar for each of two inclines, at which the support guides which form this incline end, the two horizontal bars being parallel to each other and delimiting a passage for the weft wires, and one of said bars has at least one stop to prevent the arriving weft wires from overshooting said passage.

10. A device according to claim 7, wherein the lower support system for the support guides comprises a horizontal bar for each of the two inclines, said bars being parallel to each other and forming between them a passage for the weft wires, each of said bars having a section at which the support guides of one of the inclines end and a second which faces the other incline and which has at least one stop for preventing the arriving weft wires from overshooting said passage.

11. A process for feeding weft wires to a machine (16) for welding metallic mesh, in which a series of continuous parallel metallic warp wires (1) and a series of weft wires (2) which have been cut to length are moved in substantially the same direction toward a welding station, said process comprising the steps of:
    feeding the series of weft wires (2), which have been cut to length, to an upper level which is above a lower level of the series of continuous parallel warp wires; and
    causing the weft wires (2) to undergo, under the effect of gravity, between said two levels, a change in direction by an angle, such that said weft wires are longitudinally disposed in a direction which is perpendicular to the warp wires when they reach the warp wires at said lower level by allowing said weft wires to fall along at least one helicoid incline, with which said weft wires are guided only upon their lateral surface.

12. A process according to claim 11, wherein said causing step comprises allowing said weft wires (2) to fall, by gravity, between two helicoid inclines (AB-A'B' and DC-C'D') which guide said weft wires near their free ends.

13. A process according to claim 11, wherein said angle is substantially 90°.

14. A system for feeding a machine (16) for welding metallic mesh with weft wires (2) and warp wires (1), comprising:
    supply means for supplying a series of continuous parallel warp wires toward said machine;
    holding means located above said supply means for holding a series of weft wires (2) which have been cut to length;
    a transfer device (5) which is placed between said holding means and said supply means, said series of continuous parallel warp wires (1) supplied by said supply means being at a lower level than the series of weft wires (2) held by said holding means, said transfer device (5) receiving, by gravity, the cut weft wires from said holding means and comprising at least one helicoid incline (8) along which the cut weft wires (2) are caused to undergo, also by gravity, a change in direction, so that at the lower end of said incline (8), the weft wires (2) extend in a direction which is substantially perpendicular to the direction in which the series of parallel warp wires advances; and
    stopping means (80, 90) disposed at the lower end of the incline (8) for stopping the weft wires (2) when they are perpendicular to the direction of the warp wires (1) and for allowing said weft wires (2) to fall, by their own weight, onto the series of warp wires (1) supplied by said supply means.

15. A system according to claim 14, in which the transfer device (5) comprises two spaced helicoid inclines (8) each of which comprises a series of support guides ($8_1$, $8_2$, $8_3$; $8_1'$, $8_2'$, $8_3'$) having the shape of helices which have a same pitch and have a common axis of rotation which is substantially perpendicular to the series of parallel warp wires (1) supplied by said supply means.

16. A system according to claim 15, in which the transfer device (5) comprises, a first pair of spaced parallel bars (7, 7') and a second pair of spaced parallel bars (20, 20'), the support guides ($8_1$, $8_2$, $8_3$; $8_1'$, $8_2'$, $8_3'$) being attached at their upper ends respectively to one bar of said first pair of spaced bars (7,7') and at their lower ends respectively to one bar of said second pair of spaced bars (20,20'), the first pair of bars (7,7') being perpendicular to the second pair of parallel bars (20,20'), each pair of bars (7,7'; 20,20') defining a passage therebetween for the cut weft wires (1) which enter the transfer device (5) through one of said passages and leave another (200) of said passages, one (7,20) of the bars of each pair of bars (7,7'; 20,20') having at least one stop at at least one end thereof for arresting and thereby preventing the arriving weft wires from overshooting a passage.

17. A system according to claim 16, further comprising:
    uprights (211, 212, 213) for holding at intervals the support guides ($8_1$, $8_2$, $8_3$; $8_1'$, $8_2'$, $8_3'$); and
    radial beams (311, 312, 313) connected to each other by arms (40, 500) and radiating from the axis of rotation (ZZ) of the transfer device (5) for supporting said uprights.

* * * * *